US009426007B1

(12) United States Patent
Su

(10) Patent No.: US 9,426,007 B1
(45) Date of Patent: Aug. 23, 2016

(54) ALIGNMENT OF SIGNAL COPIES FROM AN ASYNCHRONOUS SENSOR NETWORK

(71) Applicant: The United States of America, as represented by the Secretary of the Army, Washington, DC (US)

(72) Inventor: Wei Su, Bel Air, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 43 days.

(21) Appl. No.: 13/947,435

(22) Filed: Jul. 22, 2013

(51) Int. Cl.
*H04L 27/06* (2006.01)
*H04L 27/00* (2006.01)
*H04B 3/23* (2006.01)
*H04B 1/7115* (2011.01)

(52) U.S. Cl.
CPC ......... *H04L 27/0012* (2013.01); *H04B 1/7115* (2013.01); *H04B 3/23* (2013.01)

(58) Field of Classification Search
CPC ............................... H04B 1/7115; H04B 3/23
USPC .................. 375/147, 340, 347, 349
See application file for complete search history.

(56) References Cited

U.S. PATENT DOCUMENTS

| 8,085,882 | B1* | 12/2011 | Su | 375/340 |
|---|---|---|---|---|
| 8,755,469 | B1* | 6/2014 | Su | 375/340 |
| 2005/0219081 | A1 | 10/2005 | Lee et al. | |
| 2007/0002961 | A1* | 1/2007 | Hoctor et al. | 375/267 |
| 2007/0165838 | A1 | 7/2007 | Li et al. | |
| 2011/0219081 | A1 | 9/2011 | Parthasarathy et al. | |

OTHER PUBLICATIONS

W. Su and J. Kosinski, "Framework of Network Centric Signal Sensing for Automatic Modulation Classification," 2010 IEEE International Conference on Networking, Sensing and Control, Chicago, IL. Apr. 2010.

J. Xu, W. Su, and M. Zhou, "Distributed Automatic Modulation Classification with Multiple Sensors." IEEE Sensors Journal, vol. 10, Issue: 11, Nov. 2010, pp. 1779-1785.

J. L Xu, W. Su, and M. Zhou, "Asynchronous and High Accuracy Digital Modulated Signal Detec-tion by Sensor Networks," MILCOM 2011, Baltimore, MD, Nov. 2011.

Y. Zhang, N. Ansari and W. Su, "Optimal Decision Fusion based Automatic Modulation Classifica-tion by using Wireless Sensor Networks in Multipath Fading Channel," IEEE GlobeCom 2011, Hus-ton, TX, Dec. 2011.

Y. Zhang, N. Ansari, and W. Su, "Multi-sensor Signal Fusion based Modulation Classification by using Wireless Sensor Networks in AWGN Channel," IEEE International Conference on Communications, Kyoto, Japan, Jun. 2011.

W. Su, J. A. Kosinski, and M. Yu, "Dual-use of Modulation Recognition Techniques for Digital Communication Signals," in Proc. IEEE LISAT, Long Island, NY, May 2006, pp. 1-6.

* cited by examiner

*Primary Examiner* — Leila Malek
(74) *Attorney, Agent, or Firm* — Azza Jayaprakash

(57) ABSTRACT

Various embodiments associated with resampling signal copies for asynchronous sensors are described. A plurality of asynchronous sensors that sample signals at different frequencies can be distributed in an area. These sensors can sense a signal of interest for an entity. The sensors can send copies of the signal of interest that they have sensed to a system of the entity for processing. However, since the sensors are asynchronous the copies are sampled at different sampling time periods or sampling frequencies. A specific copy of the signal of interest can be selected from among the copies as a reference to estimate relative sampling frequency offset and the remaining copies can be resampled such that their resampled sampling time period or sampling frequency align with the reference signal. With the copies aligned, combination of the copies occurs and further processing can take place.

20 Claims, 14 Drawing Sheets

ALIGNMENT OF SIGNAL COPIES FROM AN ASYNCHRONOUS SENSOR NETWORK

GOVERNMENT INTEREST

The innovation described herein may be manufactured, used, imported, sold, and licensed by or for the Government of the United States of America without the payment of any royalty thereon or therefor.

BACKGROUND

In a combat environment, different forces can broadcast different signals. In a singular environment, enemy combatants can each broadcast different signals. It may be possible for one combatant to intercept the signal of another combatant. The intercepting combatant may not know the modulation scheme of an intercepted signal. Without the modulation scheme, it may be difficult to put the intercepted signal to use.

SUMMARY

A system comprising a processor and a non-transitory computer-readable medium is described. The non-transitory computer-readable medium is communicatively coupled to the processor and stores a processor-executable command set to facilitate operation of components comprising an identification component and a resample component. The identification component is configured to identify a first signal copy as a reference signal, where the first signal copy is a copy of a signal of interest from a first sensor, where the first signal copy is a digital signal sampled at a first sampling time period. The resample component is configured to resample a second signal copy of the signal of interest in accordance with the first sampling time period to produce a resampled second signal copy, where the second signal copy is a digital signal sampled at a second sampling time period, where the first sampling time period and the second sampling time period are different, and where the first sensor and second sensor are different sensors.

A system comprising a receiver, a selection component, a resample component, and a fusion component is described. The receiver receives a first signal copy of a signal of interest from a first sensor and that receives a second signal copy of the signal of interest from a second sensor, where the first signal copy is a digital signal sampled at a first sampling frequency, where the second signal copy is a digital signal sampled at a second sampling frequency, where the first sampling frequency and the second sampling frequency are different, and where the first sensor and second sensor are different non-cooperative sensors. The selection component selects the first signal copy as a reference signal. The resample component resamples the second signal copy according to the first sampling frequency to produce a resampled second signal copy. The fusion component fuses the first signal copy and the resampled second signal copy into a combined signal of the signal of interest.

A non-transitory computer-readable medium configured to store computer-executable instructions that when executed by a processor cause the processor to perform a method is described. The method comprises receiving a first signal copy of a signal of interest from a first sensor, where the first signal copy is a digital signal sampled at a first sampling time period. The method also comprises receiving a second signal copy of a signal of interest from a second sensor, where the second signal copy is a digital signal sampled at a second sampling time period, where the first sampling time period is different from the second sampling time period, where the first sensor and second sensor are different sensors, and where the first sensor and second sensor are asynchronous. The method further comprises identifying the first sampling time period. In addition, the method comprises resampling the second signal copy in accordance with the first sampling time period to produce a resampled second signal copy, where the resampled second signal copy and the first signal copy have the same sampling time period. The method also comprises fusing the first signal copy and the second signal copy into a fused signal copy along with matching the signal of interest with a known signal. The method additionally comprises identifying a modulation scheme associated with the known signal, demodulating the signal of interest through use of the modulation scheme, and outputting the signal of interest after demodulation.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
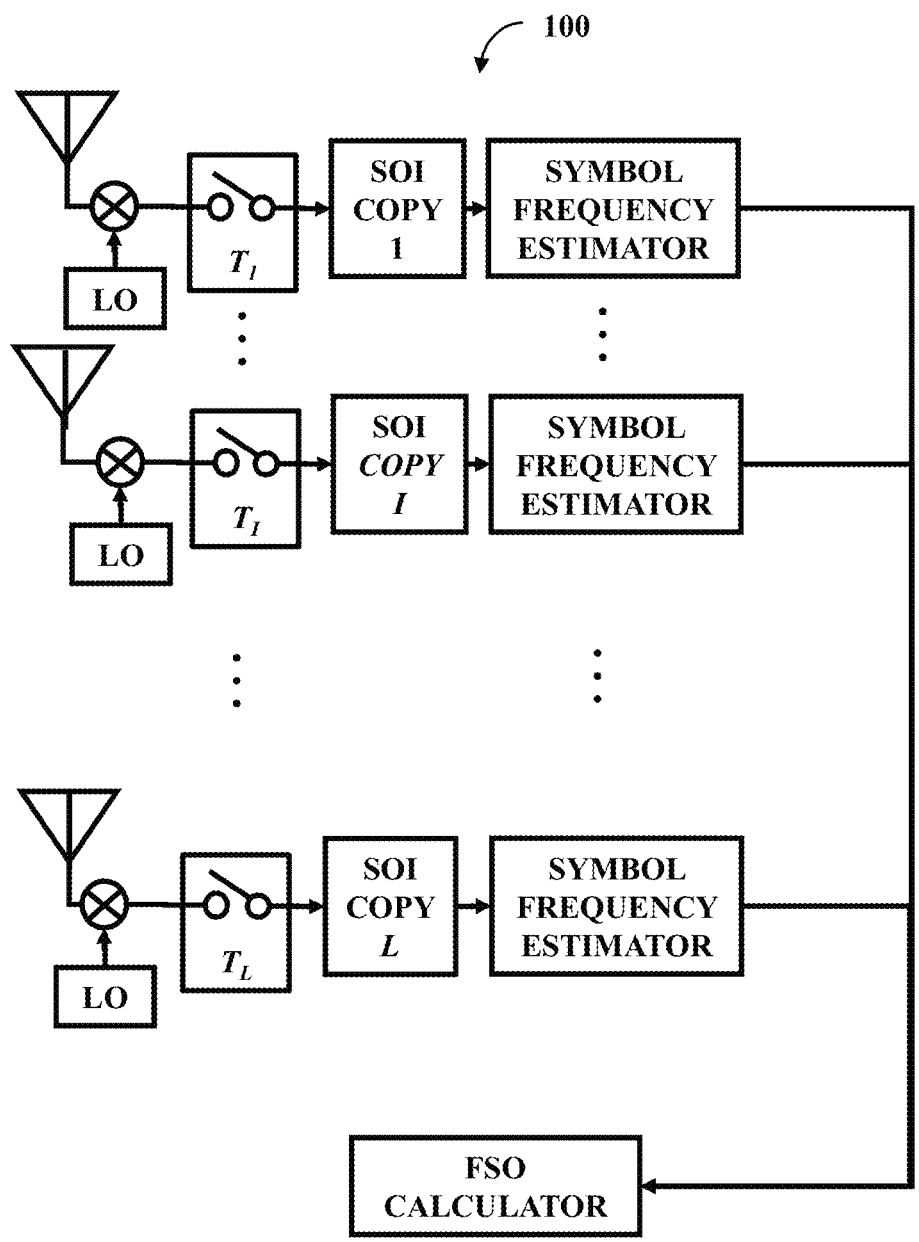
FIG. 1 illustrates one embodiment of fusion center.

A simple but effective method can be used to estimate sampling offsets of distributed digital signal copies in sensor networks without knowing the actual sampling frequencies. Asynchronous digital signal copies can be coherently combined after estimating the sampling frequency offset without adjusting the sensor parameters or tuning the sampling clocks. The properly combined signal from the distributed sensors can achieve a higher processing gain for reliable signal exploitation.

Distributed signal sensing and classification can be practiced through multiple-antenna based coherent signal combining and exploitation. However, when multiple antenna practices extend to multiple asynchronous and heterogeneous sensors in distributed geographic locations, the distributed signal copies may be asynchronous or may not be able to be synchronized (e.g., perfectly synchronized). With this, the carrier phases, carrier frequencies, symbol timing, and sampling frequency among sensors are all different. Consequently, a fusion center can be employed to estimate relative phase offset (RPO) induced by different local oscillators (LOs), channels and filters, relative time offset (RTO) induced by different propagation paths and sampling clocks, and relative frequency offset (RFO) induced by different LOs and the Doppler effect. However, estimation of those offsets and the combining of multiple signal copies may be difficult if the signal copies are sampled at the different frequencies due to diversity and drifts of sampling clocks of respective sensors. In such case, samples of signal copies are not lined up in time due to the existence of the relative sampling-frequency offset (RSO) between digital signal copies. A method can be employed to estimate RSO without the knowledge of actual sampling rates at the distributed sensors.

A central decision based distributed signal sensing method can use simple, inexpensive, low-maintenance, and heterogeneous sensors. These sensors can be deployed to cover a wide-spread geographical area seamlessly and multiple narrow-band receivers can be collaborated to handle a wide frequency band effectively. The distributed sensors can be clustered and orchestrated by a fusion center, which has sufficient processing power and time to estimate, analyze, and process the data delivered by the sensors to generate an enhanced signal for detection, classification, and blind demodulation. The fusion center can send a periodic requesting signal to L distributed sensors, $R_1, R_2, \ldots,$ and $R_L$ to acquire a weak signal of interest (SOI). Upon the reception of the request, the distributed sensors can take short time duration snapshots of the SOT. The distributed sensors can be configured to provide very limited signal processing capabilities such as radio frequency reception and transmission, frequency tuning and down-conversion, filtering, and digitization. Thus, the sensors are asynchronous and non-cooperative to one another and are used for communicating with, or relaying distributed snapshots to, the fusion center.

Under a dumb sensor scenario, the sensors do not make local decisions but store the short snapshots, $r_i(t)$, i=1, 2, . . . , L, as time-stamped data packets and forward them to the fusion center for processing. The packets can be transmitted to the fusion center using various communication methods. Without loss of generality, $R_1$ can function as a reference sensor, $R_2, R_3, \ldots,$ and $R_L$ can be compared to $R_1$ for calculating all offsets. In one embodiment, channels have no noticeable change within a very short collection time period.

FIG. 1 illustrates one embodiment of a fusion center 100. A digital signal packet sent by the $i^{th}$ sensor and received at the fusion center 100 is called SOI copy i which can be described as $$r_i(t) = \Delta\alpha_i e^{j(\Delta\omega_i t + \Delta\beta_i)} s(t - \Delta\tau_i) + n_i(t) \qquad (1)$$

where $\Delta\omega_i$, $\Delta\beta_i$, and $\Delta\tau_i$ are RFO, RPO, and RTO, respectively, and $\Delta\alpha_i$ is the relative magnitude offset (RMO) which may not be known in post-synchronization. Relative offsets are referred to as:

$$r_1(t) = s(t) + n_1(t) \qquad (2)$$

where i=1, $\Delta\omega_1 = \Delta\beta_1 = \Delta\tau_1 = 0$, $\Delta\alpha_1 = 1$, $s(t) = a_0 s_0(t) e^{j(\omega_0 t + \beta_0)}$. A frequency down-converted copy of the SOI observed at $R_1$, $s_0(t)$ is a sequence of pulse shaped information symbols, $\alpha_0$, $\omega_0$, and $\beta_0$ that are magnitude, frequency, and phase offsets between the transmitter and $R_1$, respectively, and $n_i \sim \mathcal{N}(0, \sigma_i)$ is i.i.d. circularly symmetric complex additive white Gaussian noise (AWGN).

When signal sampling clocks are not in the same frequency then the sampling time periods $T_1$ and $T_i$ between two adjacent samples in $r_1$ and $r_i$ are not the same. Therefore, SOI copies digitized at $r_1$ and $r_i$ are sampled at $t_{s,1} = kT_1$ and $t_{s,i} = kT_i$, respectively, where k is a positive integer. If the discrete times are normalized to a common reference $r_1$, that is $$t_{s,i} = \frac{kT_i}{T_1},$$

the digitized signal is described by $$r_i(t_{s,i}) = r_i(k\Delta T_i) = \Delta\alpha_i e^{j(\Delta\omega_i k\Delta T_i + \Delta\beta_i)} s[(k - \Delta k_i)\Delta T_i] + n_i(k\Delta T_i) \qquad (3)$$

where, k=1, 2, . . . , K, $$\Delta T_i = \frac{T_i}{T_1},$$

and $\Delta k_i$ is the positive integer less than the oversampling rate. The signal samples in (3) are in general not lined up in time with the samples in $$r_1(t_{s,i}) = r_1(k) = s(k) + n_1(k) \qquad (4)$$

unless i=1 due to the RSO and the RSO is defined by $1/\Delta T_i$. $T_1, T_2, \ldots, T_L$ observed at the fusion center may be neither accurate nor precise due to the lack of a common time reference. In order to process the asynchronous signal copies, the symbol time $T_b$ of the SOI, which is not affected by the different sampling time period and different sensors, is used as the reference to estimate the RSO. Symbol Frequency Estimators can be used to detect and estimate the frequency peak caused by the symbol frequency. Note that the actual symbol frequencies may not be known to the fusion center.

Figure 2:
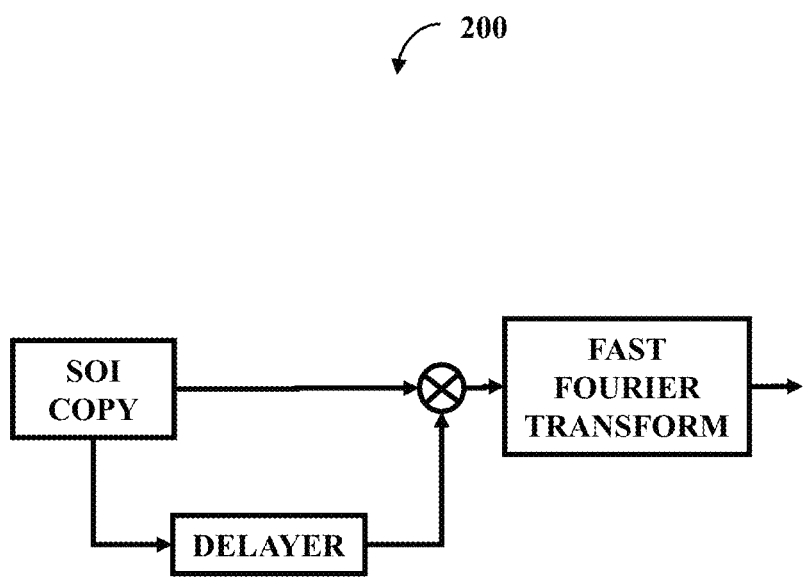
FIG. 2 illustrates one embodiment of a symbol frequency detecting implementation.

FIG. 2 illustrates one embodiment of a symbol frequency detecting implementation 200. The implementation (e.g., that can be implemented as a system through use of at least one component) can use a Fast Fourier Transform of a delay multiplier. Other methods can also be used for detecting the peak of symbol frequency.

Defining $\lambda_1$ and $\lambda_i$ to be the oversampling rate of $r_1$ and $r_i$, respectively, which can be measured by using the spectrum-based symbol frequency estimation methods the symbol time period can be represented by $$T_b = \lambda_1 T_1 = \lambda_i T_i \tag{5}$$

which yields the RSO $$\Delta T_i = \frac{T_i}{T_1} = \frac{\lambda_1}{\lambda_i}, \tag{6}$$

and the re-sampling rate $$v_i = 1/\Delta T_i \text{ for } r_i. \tag{7}$$

Therefore, after $\lambda_i$ being estimated by the Symbol Frequency Estimators, it can be used by the FSO Calculator to computer the RSO and re-sampling rate. Knowledge of the actual values of both $T_i$ and $T_b$ may not be known in estimating $\Delta T_i$.

The RSO can be used to compensate $r_i$ so that $$r_i(t_{s,i}/\Delta \hat{T}_i) = \Delta \alpha_i e^{j\left(\Delta \omega_i k \frac{\Delta T_i}{\Delta \hat{T}_i} + \Delta \beta_i\right)} s\left[(k - \Delta k_i)\frac{\Delta T_i}{\Delta \hat{T}_i}\right] + n_i\left(k\frac{\Delta T_i}{\Delta \hat{T}_i}\right) \tag{8}$$

If the estimation of RSO is accurate (e.g., $\Delta \hat{T}_i = \Delta T_i$) it becomes $$r_i(k) = \Delta \alpha_i e^{-j(\Delta \omega_i k + \Delta \beta_i)} s(k - \Delta k_i) + n_i(k) \tag{9}$$

At this point, estimates can be made by searching such that the magnitude of $$\chi(\Delta \hat{\omega}_i, \Delta \hat{k}_i) = \sum_{k \in T_W} e^{-j\Delta \hat{\omega}(k + \Delta \hat{k})} r_1^*(k) r_i(k + \Delta \hat{k}_i) \approx \tag{10}$$

$$\Delta a_i e^{j(\Delta \beta_i)} \sum_{k \in T} s_1^*(k) s_i(t - \Delta k_i + \Delta \hat{k}_i)$$

is a maximum within the searching window $T_w$. Then, $\Delta \hat{\beta}_i$ can be calculated from the phase of $\chi(\Delta \hat{\omega}_i, \Delta \hat{k}_i)$.

The L compensated signals can be combined coherently as follows $$r^c(k) = \sum_{i=1}^{L} \Delta \alpha_i e^{-j\left[\Delta \hat{\omega}_i(k + \Delta \hat{k})\frac{\Delta T_i}{\Delta \hat{T}_i} + \Delta \hat{\beta}_i\right]} r_i\left(\frac{t_{s,i} + \Delta \hat{k} \Delta T_i}{\Delta \hat{T}_i}\right) + n^c = \tag{11}$$

$$\sum_{i=1}^{L} \Delta \alpha_i e^{-j\left[(\Delta \hat{\omega}_i - \Delta \omega_i)(k + \Delta \hat{k})\frac{\Delta T_i}{\Delta \hat{T}_i} + \Delta \hat{\beta}_i - \Delta \beta_i\right]} s(k + \Delta \hat{k}_i - \Delta k_i)\frac{\Delta T_i}{\Delta \hat{T}_i} + n^c \approx$$

$$\sum_{i=1}^{L} \Delta \alpha_i s(k)$$

where $n^c$ is the combined noise which can be diminish when L is large. If the signals have equal gains and noises have equal variances, the SNR of the combined signal is L times the SNR of a single signal.

A coherently combined signal can be a more accurate description of the SOT which can be used for spectrum sensing, signal detection, modulation classification, geolocation, specific emitter identification, and many other signal estimation applications.

Figure 3:
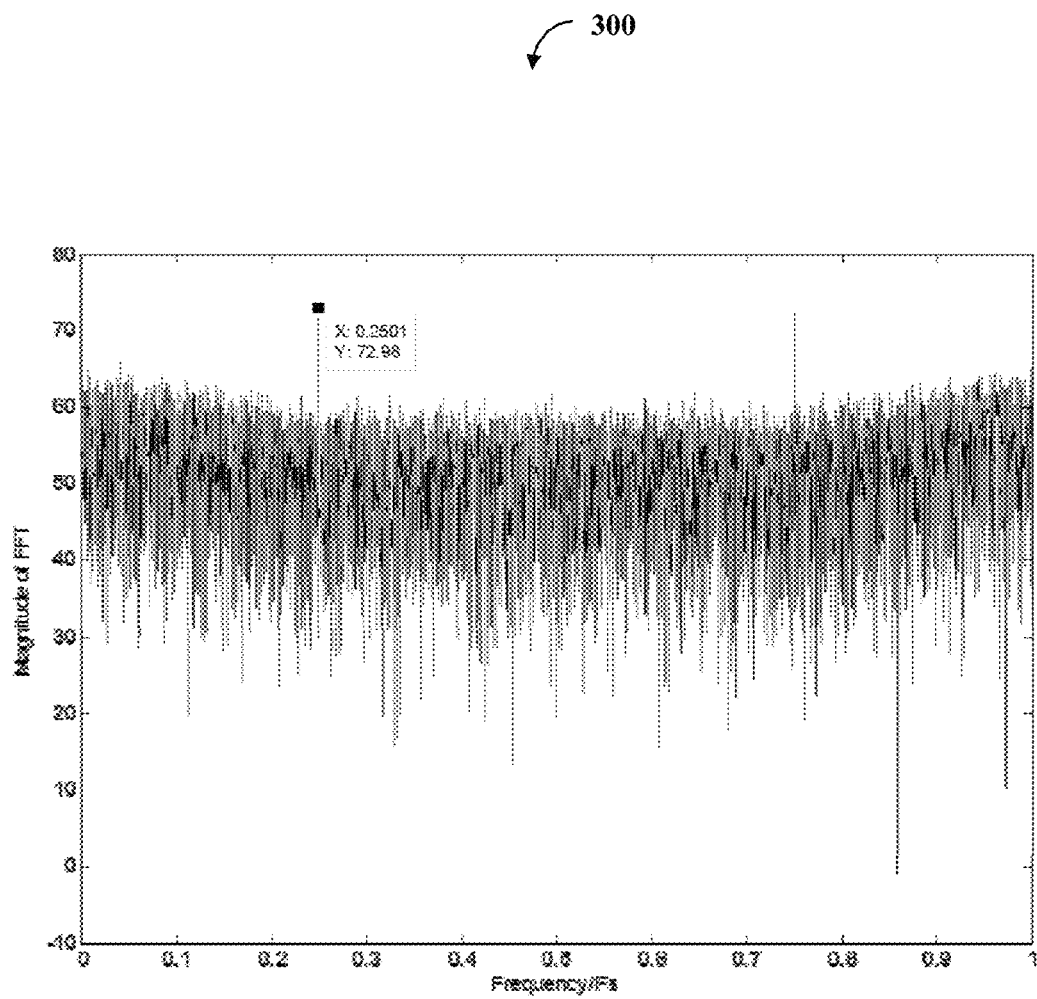
FIG. 3 illustrates one embodiment of a first graph.
Figure 4:
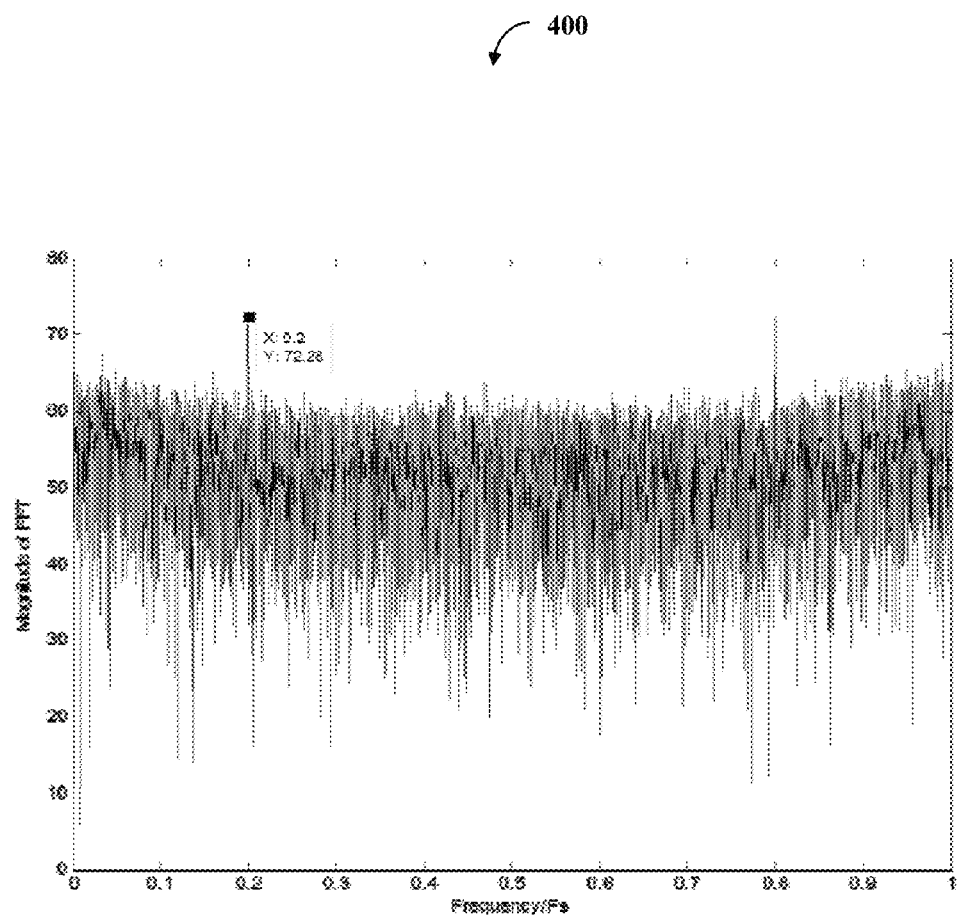
FIG. 4 illustrates one embodiment of a second graph.

FIG. 3 illustrates one embodiment of a first graph 300 while FIG. 4 illustrates one embodiment of a second graph 400. These graphs are produced from running a computer simulation and show a peak that illustrates a normalized symbol frequency. A 16-ary Quadrature Amplitude Modulation (16QAM) signal can be generated with 5,000 symbols, which are random integers processed by a square-root raised cosine filter with a roll-off factor of 0.35 and SNR=0 dB. The signal copy $r_1$ can be sampled at four samples per symbol and the signal copy $r_2$ is at 5 samples per symbol. A peak of symbol frequency is detected by taking the delay multiply of the signal samples with a delay of 4 samples. The magnitude of the FFT of the delay multiplies of $r_1$ and $r_2$ are shown in the graph 300 and the graph 400, respectively, with the maximum frequencies being normalized to one.

The peaks induced by the normalized symbol frequency, $T_i/T_b$, are observed at 0.25 for $r_1$ and 0.2 for $r_2$ so that the over-sampling rates are estimated to be $\lambda_1=1/0.25=4$, $\lambda_2=1/0.2=5$, the sampling time period offset is $\Delta T_2=0.8$ and the resampling rate is $r_2=1.25$.

After estimating offsets, the signals can be interpreted and resampled at the same sampling rate so other offsets can be estimated, and multiple signals can be combined coherently to improve the signal quality. A coherently combined signal can have much lower bit-error rate (BER) than the former. Roughly speaking, the more sensors you use, the lower the BER will be.

Distributed sensors can be used for collecting and classifying a weak signal and may have superior classification performance than using a single sensor. However, the digitized signal copies in an asynchronous sensor network may be sampled at different sampling time periods due to diversity and drifts of sampling clocks of respective sensors. In such case, samples of signal copies are not lined up in time due to the existence of the relative sampling-frequency offset between digital signal copies and an alignment method can be used to correct this situation.

In one embodiment, asynchronous and heterogenous sensors can be used to leverage low-cost or existing communication devices and networks without significant investment. The relative sampling frequency offsets (RSO) between signal copies can be estimated and compensated before the signal copies can be further processed. The RSO can be obtained by estimating the oversampling rates without knowing the actual symbol frequency of the SOI and the sampling frequencies at distributed sensors. Therefore, other parameter offsets such as RFO, RTO, and RPO can be estimated and the signal can be coherently combined.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

A plurality of asynchronous sensors that sample signals at different frequencies can be distributed in an area. These sensors can sense a signal of interest for an entity. The sensors can send copies of the signal of interest that they have sensed to a system of the entity for processing. However, since the sensors are asynchronous the copies are sampled at different sampling time periods or sampling frequencies. A frequency can be selected from among the copies as a reference signal to estimate the RSO and the remaining copies can be resampled such that their resampled sampling time period or sampling frequency align with the reference signal. With the copies aligned, combination of the copies occurs and further processing can take place.

Figure 5:
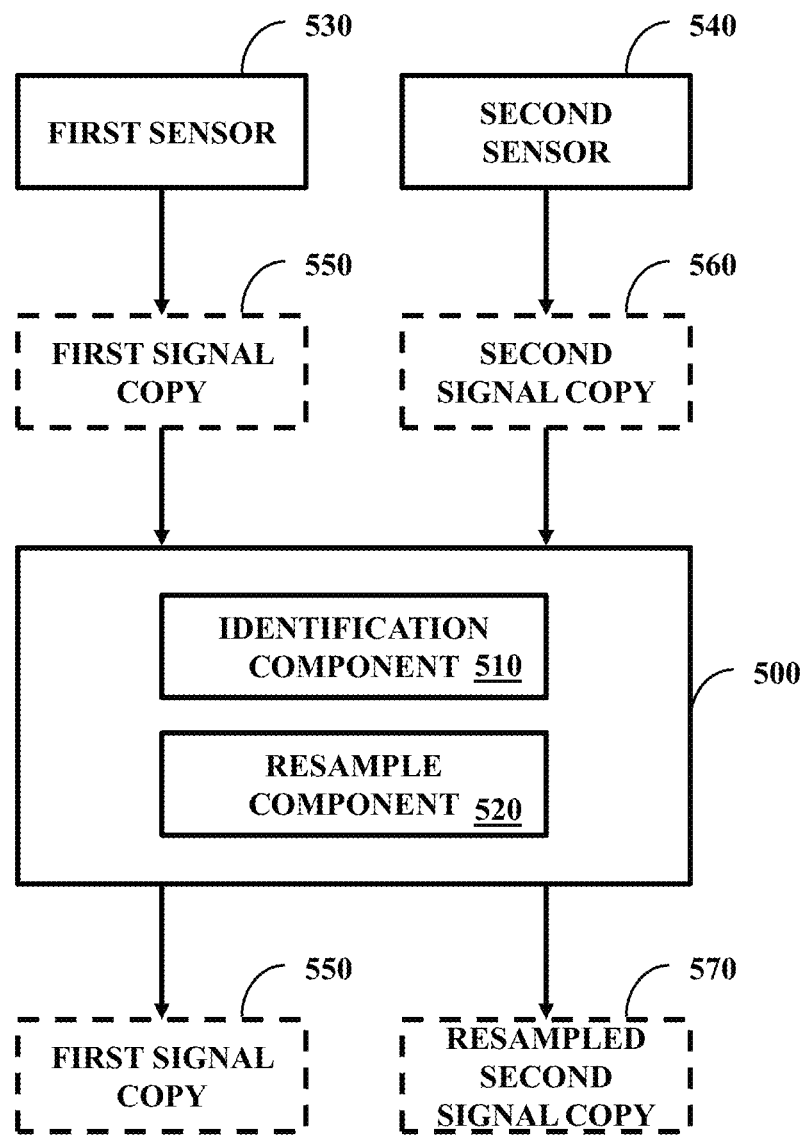
FIG. 5 illustrates one embodiment of a system comprising an identification component and a resample component.

FIG. 5 illustrates one embodiment of a system 500 comprising an identification component 510 and a resample component 520. The system 500 is in communication with a first sensor 530 and a second sensor 540 that submit a first signal copy 550 and a second signal copy 560. While aspects disclosed herein address two sensors and two signal copies, it is to be appreciated by one of ordinary skill in the art that more than two sensors with more than two signal copies can be employed.

The identification component 510 is configured to identify the first signal copy 550 as a reference signal. The first signal copy 550 is a copy of a signal of interest from the first sensor 530 and is a digital signal sampled at a first sampling time period. In one embodiment, the identification component 510 chooses the first signal copy 550 as the reference signal. This choice can be based on the first signal copy 550 being the first signal copy received in time, the first signal copy 550 being the easiest to identify its sampling time period as compared to other signal copies, etc.

The resample component 520 is configured to resample the second signal copy 560 (e.g., and estimate RSO) of the signal of interest in accordance with the first sampling time period to produce a resampled second signal copy 570. The second signal copy 560 is a digital signal sampled at a second sampling time period. The first sampling time period and the second sampling time period are different and the first sensor 530 and second sensor 540 are different sensors (e.g., different physical sensors, different models of sensors, different brands of sensors, etc.). Therefore, the system 500 can function such that the first signal copy 550 and resampled second signal copy 570 are made available and have the same sampling time period or frequency.

In one embodiment, the first sensor 530 is part of a first personal electronic device with a primary purpose other than functioning as a sensor of the first signal copy 550. In addition, the second sensor 540 is part of a second personal electronic device with a primary purpose other than functioning as a sensor of the second signal copy 560. In one example, military radios of individual soldiers can function as the first sensor 530 and the second sensor 540. These radios can have the primary function of allowing soldiers to communicate with one another. When they are not employed for that primary function, the radios can function as the sensors 530 and 540. In one example, the first personal electronic device can be a first smartphone while the second electronic device can be a second smartphone. These smartphones can be different smartphones in that they are different physical smartphones, different versions of a same smartphone, different smartphone models, smartphones made by different manufacturers, etc.

In one embodiment, the first sensor 530 is part of a first network, the second sensor 540 is part of a second network, and the first network and second network are different networks. In one example, the first sensor 530 can be a smartphone that uses a network of a first cellular carrier and the second sensor 540 can be a non-smart cellular telephone that uses a network of a second cellular carrier. These cellular carriers can operate different networks. In one example, the first sensor 530 can be a global positioning system and the second sensor 540 can be a tablet personal computer.

The personal electronic devices may or may not be made aware of their use as the first sensor 530 or the second sensor 540. In one embodiment, the system 500 can request a personal electronic device or other device to function as the first sensor 530 or second sensor 540. In one embodiment, the system 500 can identify a personal electronic device or other device that can be the first sensor 530 or second sensor 540 and/or cause that personal electronic device or other device to become the first sensor 530 or second sensor 540.

Figure 6:
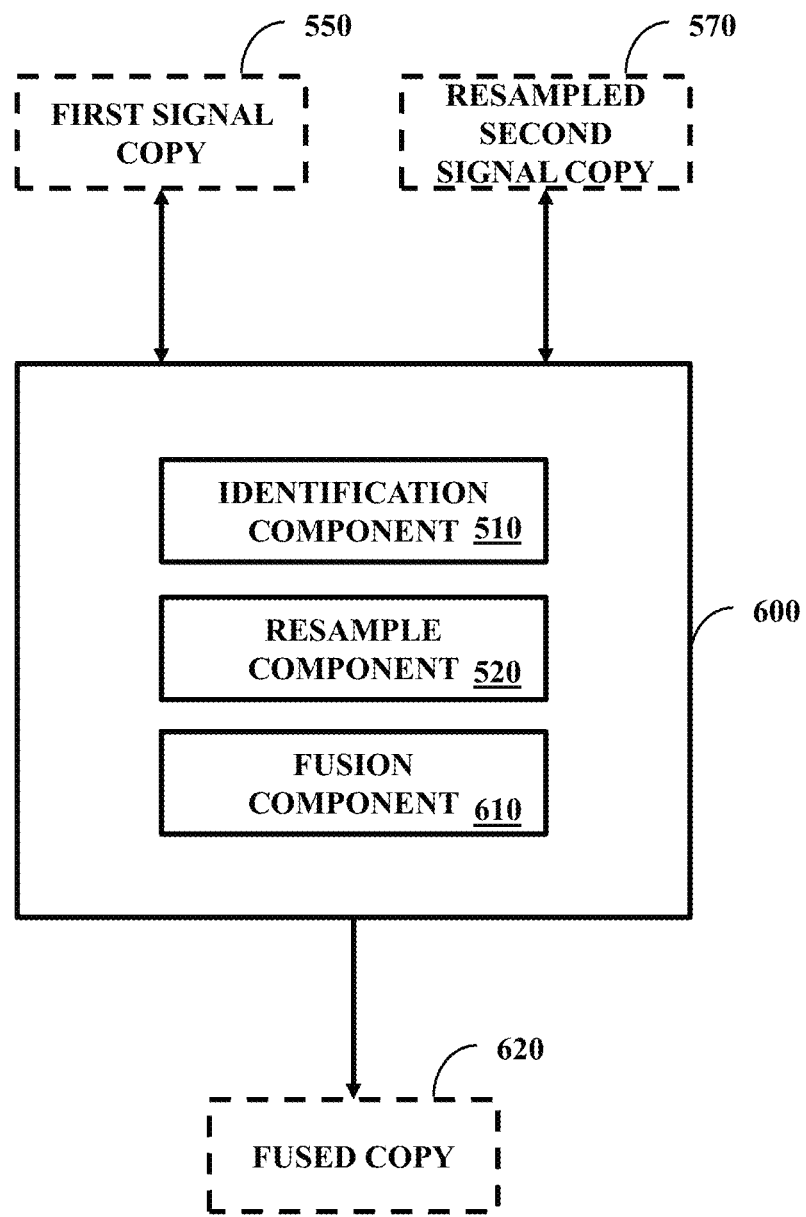
FIG. 6 illustrates one embodiment of a system comprising the identification component, the resample component, and a fusion component.

FIG. 6 illustrates one embodiment of a system 600 comprising the identification component 510, the resample component 520, and a fusion component 610. The fusion component 610 is configured to fuse the first signal copy 550 with the resampled second signal copy 570 into a fused copy 620 of the signal of interest. Thus, fusion occurs once the first signal copy 550 and the second signal copy 560 of FIG. 5 have the same sampling time period or frequency. The system 600 can include at least one feature of the fusion center 100 of FIG. 1.

Figure 7:
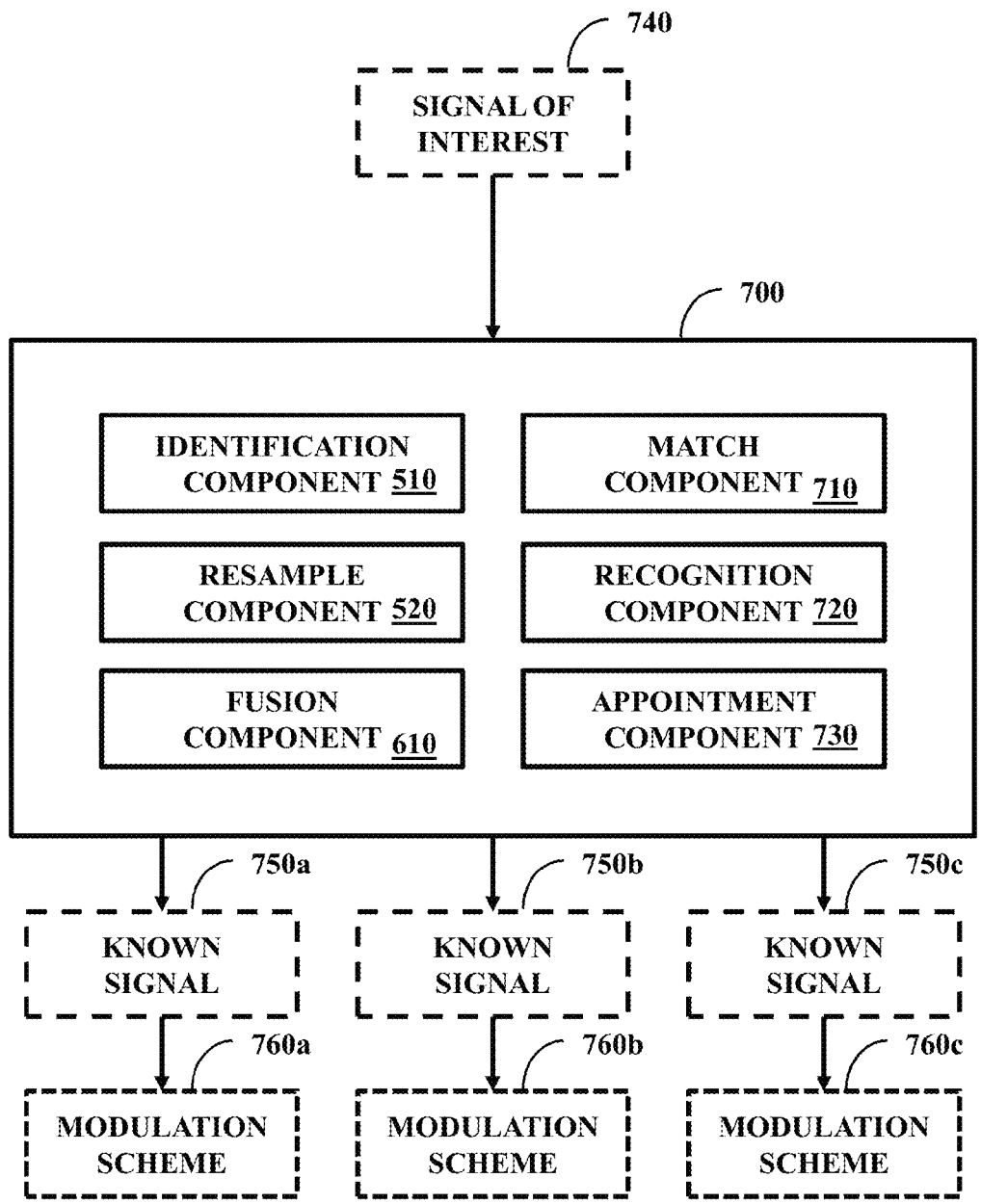
FIG. 7 illustrates one embodiment of a system comprising the identification component, the resample component, the fusion component, a match component, a recognition component, and an appointment component.

FIG. 7 illustrates one embodiment of a system 700 comprising the identification component 510, the resample component 520, the fusion component 610, a match component 710, a recognition component 720, and an appointment component 730. The match component 710 is configured to match the signal of interest 740 (e.g., the fused copy 620 of FIG. 6) with a known signal. The recognition component 720 is configured to recognize a modulation scheme associated with the known signal. The appointment component 730 is configured to appoint the modulation scheme associated with the known signal as a modulation scheme for the signal of interest 740.

The system 700 can include and/or have access to a database (e.g., a database that is a non-transitory computer-readable medium). The database can include a plurality of known signals, such as known signals 750a-750c. The known signals 750a-750c are associated with modulation schemes 760a-760c respectively. The signal of interest 740 can be compared individually with the known signals 750a-750c. A known signal that is most alike the signal of interest 740 can be identified by the match component 710. Thus, the demodulation scheme associated with the most alike known signal can be appointed as the modulation scheme for the signal of interest 740.

In one embodiment, the known signals 750a-750c can be individually subtracted from the signal of interest 740 or the signal of interest 740 can be individually subtracted from the known signals 750a-c. A known signal with the smallest remaining signal can be considered a best match. In one example, the known signal 750b can have the best match of the signal of interest 740 and therefore the modulation scheme 760b is appointed as the modulation scheme for the signal of interest 740.

In one embodiment, the match component 710 compares a constellation of the signal of interest 740 with constellations of the known signals 750a-c. The result from the constellation comparison is used by the match component 710 to match the signal of interest 740 with one of the known signals 750a-c. It is to be appreciated by one of ordinary skill in the art, while three known signals with three modulation schemes are illustrated, more or less than three can be used.

In one embodiment, the match component 710 is configured to match the signal of interest 740 with one of the known signals 750a-c before the fusion component 610 fuses the first signal copy 550 of FIG. 5 with the resampled second signal copy 570 of FIG. 5 into the fused copy 620 of FIG. 6 (e.g., fused copy of the signal of interest). Therefore, matching with a known signal, along with appointment of the modulation scheme, can occur before or after signal copies are fused together by the fusion component 610.

Figure 8:
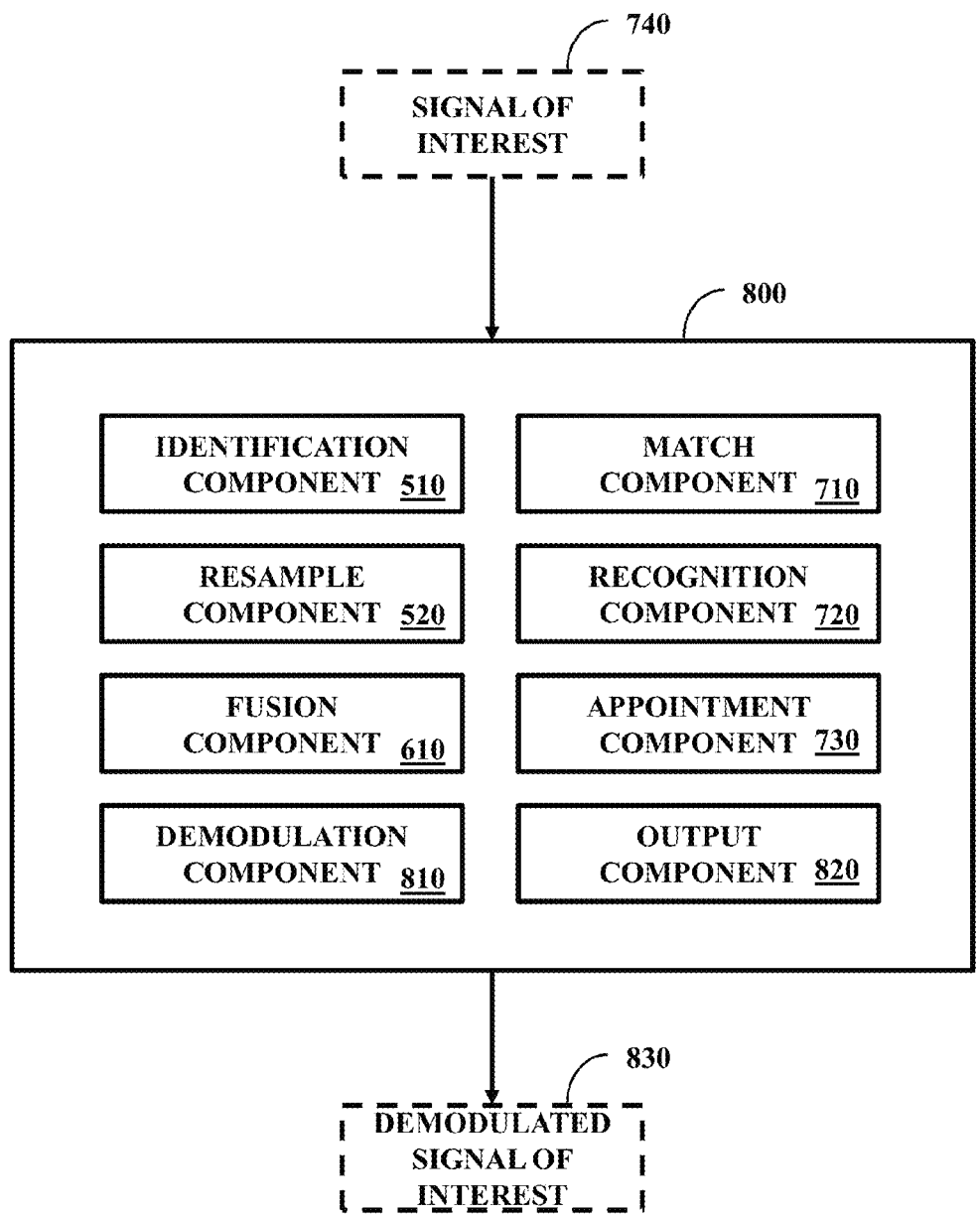
FIG. 8 illustrates one embodiment of a system comprising the identification component, the resample component, the fusion component, the match component, the recognition component, the appointment component, a demodulation component, and an output component.

FIG. 8 illustrates one embodiment of a system 800 comprising the identification component 510, the resample component 520, the fusion component 610, the match component 710, the recognition component 720, the appointment component 730, a demodulation component 810, and an output component 820. The demodulation component 810 is configured to demodulate the signal of interest 740 through use of the modulation scheme for the signal of interest 740 (e.g., the modulation scheme appointed by the appointment component 730). The output component 820 is configured to cause the signal of interest 740 to be outputted after demodulation (e.g., as a demodulated signal of interest 830).

Figure 9:
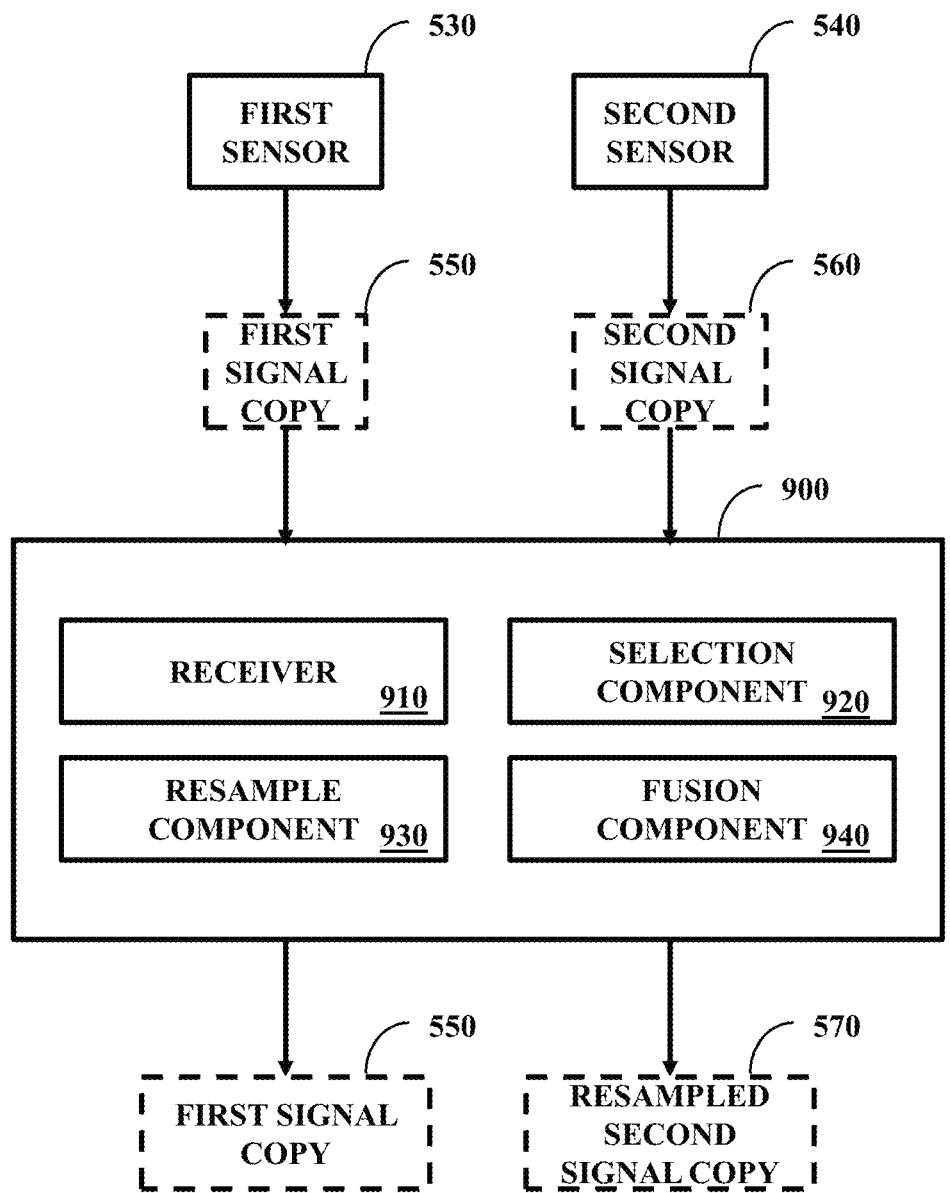
FIG. 9 illustrates one embodiment of a system comprising a receiver, a selection component, a resample component, and a fusion component.

FIG. 9 illustrates one embodiment of a system 900 comprising a receiver 910, a selection component 920, a resample component 930, and a fusion component 940. The receiver 910 (e.g., hardware receiver that includes an antenna) can receive the first signal copy 550 of the signal of interest 740 of FIG. 7 from the first sensor 530. The receiver 910 also receives the second signal copy 560 of the signal of interest 740 of FIG. 7 from the second sensor 540. The first signal copy 550 is a digital signal sampled at a first sampling frequency and the second signal copy 560 is a digital signal sampled at a second sampling frequency. The first sampling frequency and the second sampling frequency are different (e.g., not the same frequency) and the first sensor 530 and second sensor 540 are different non-cooperative sensors.

The selection component 920 can select the first signal copy 550 that is obtained from the first sensor 530 as a reference signal. Various selection methods can be used to select the first signal copy 550 as the reference signal (e.g., methods used to choose the reference time by the identification component 510 of FIG. 5).

The resample component 930 can resample the second signal copy 560 according to the first sampling frequency to produce the resampled second signal copy 570. Thus, the first signal copy 550 and the resampled second signal copy 570 can have the same sampling frequency. The fusion component 940 can fuse the first signal copy 550 and the resampled second signal copy 570 into a combined signal of the signal of interest.

Components with the same name and different reference numerals can function as the same components or different components. In one example, the fusion component 940 can be the same as the fusion component 610 of FIG. 6. In one example, the resample component 930 can be different from the resample component 520 of FIG. 5.

Figure 10:
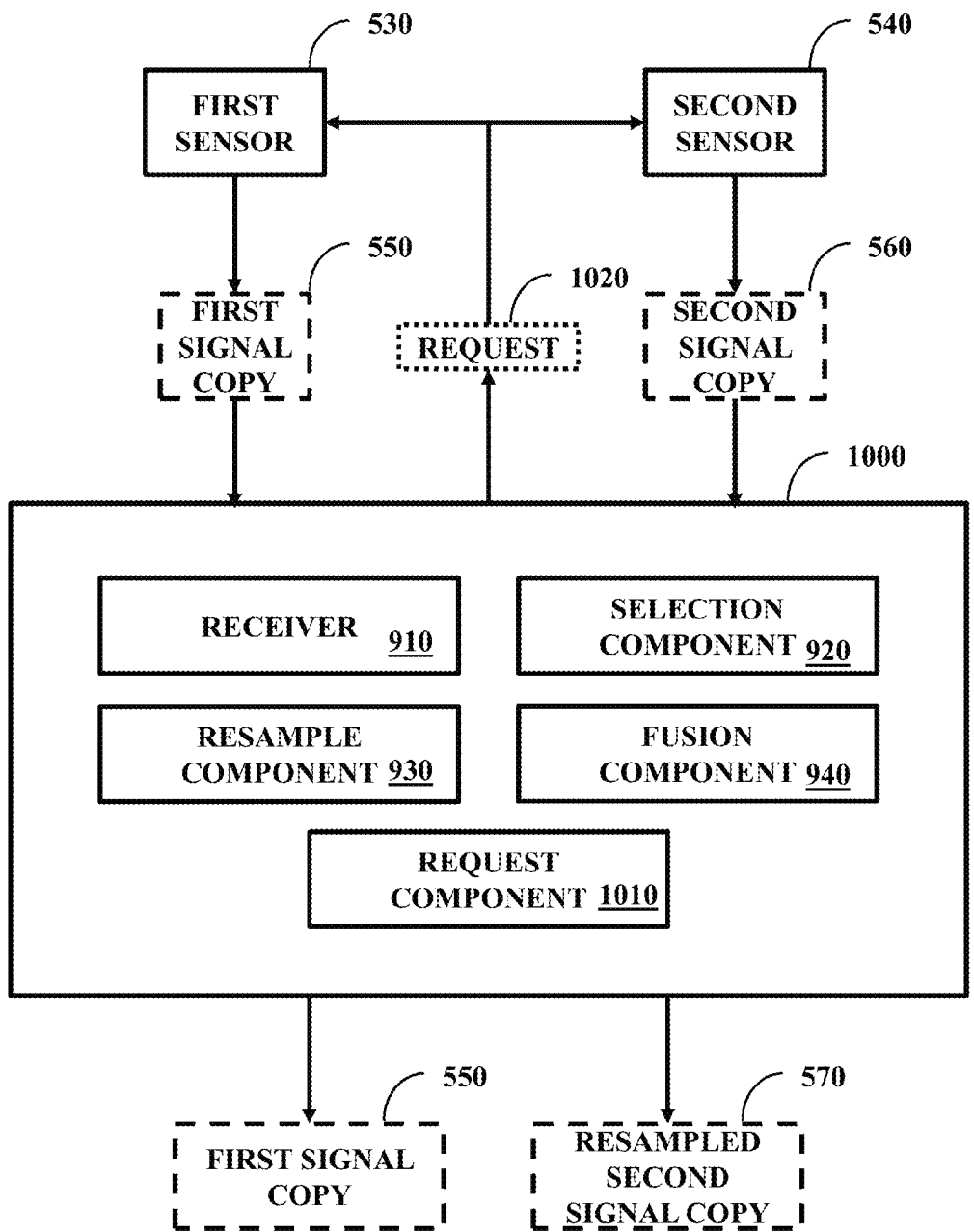
FIG. 10 illustrates one embodiment of a system comprising the receiver, the selection component, the resample component, the fusion component, and a request component.

FIG. 10 illustrates one embodiment of a system 1000 comprising the receiver 910, the selection component 920, the resample component 930, the fusion component 940, and a request component 1010. The request component 1010 can cause a request 1020 to be sent to the first sensor 530 for the first signal copy 550. The request component 1010 can also cause the request 1020 to be sent to the second sensor 540 for the second signal copy 560. The first sensor 530 sends the first signal copy 550 that is received by the receiver 910 in response to the request 1020 and the second sensor 540 sends the second signal copy 560 that is received by the receiver 910 in response to the request 1020. Based on the first signal copy 550 and the second signal copy 560 the system 1000 can produce the demodulated signal of interest 830 of FIG. 8.

The request component 1010 can cause the request 1020 to be sent in a variety of different manners. In one example, a broad request is sent out where a sensor that receives the broad request sends a copy in return. The broad request can be directed to a receiving sensor and not directed to a particular sensor. In one example, a request is sent that is directed to at least one specific sensor. In one example, an individual request is sent out to an individual sensor (e.g., a first request is sent to the first sensor 530 and a second request is sent to the second sensor 540).

Figure 11:
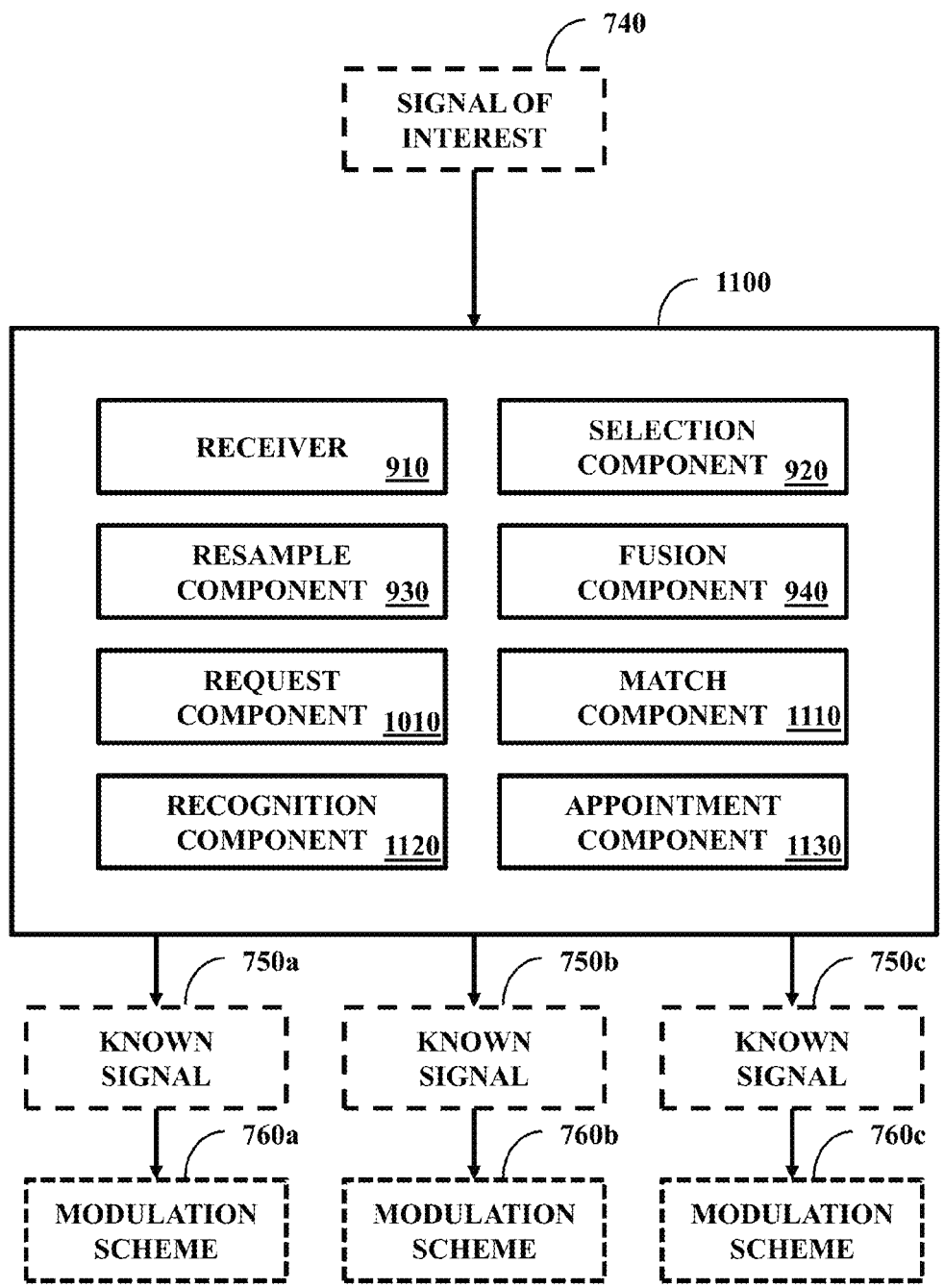
FIG. 11 illustrates one embodiment of a system comprising the receiver, the selection component, the resample component, the fusion component, the request component, a match component, a recognition component, and an appointment component.

FIG. 11 illustrates one embodiment of a system 1100 comprising the receiver 910, the selection component 920, the resample component 930, the fusion component 940, the request component 1010, a match component 1110, a recognition component 1120, and an appointment component 1130. The match component 1110 can match the signal of interest 740 with a known signal (e.g., a known signal 750a-c). The recognition component 1120 can recognize a modulation scheme (e.g., modulation scheme 760a-c) associated with the known signal. The appointment component 1130 can appoint the modulation scheme associated with the known signal as a modulation scheme for the signal of interest 740.

Figure 12:
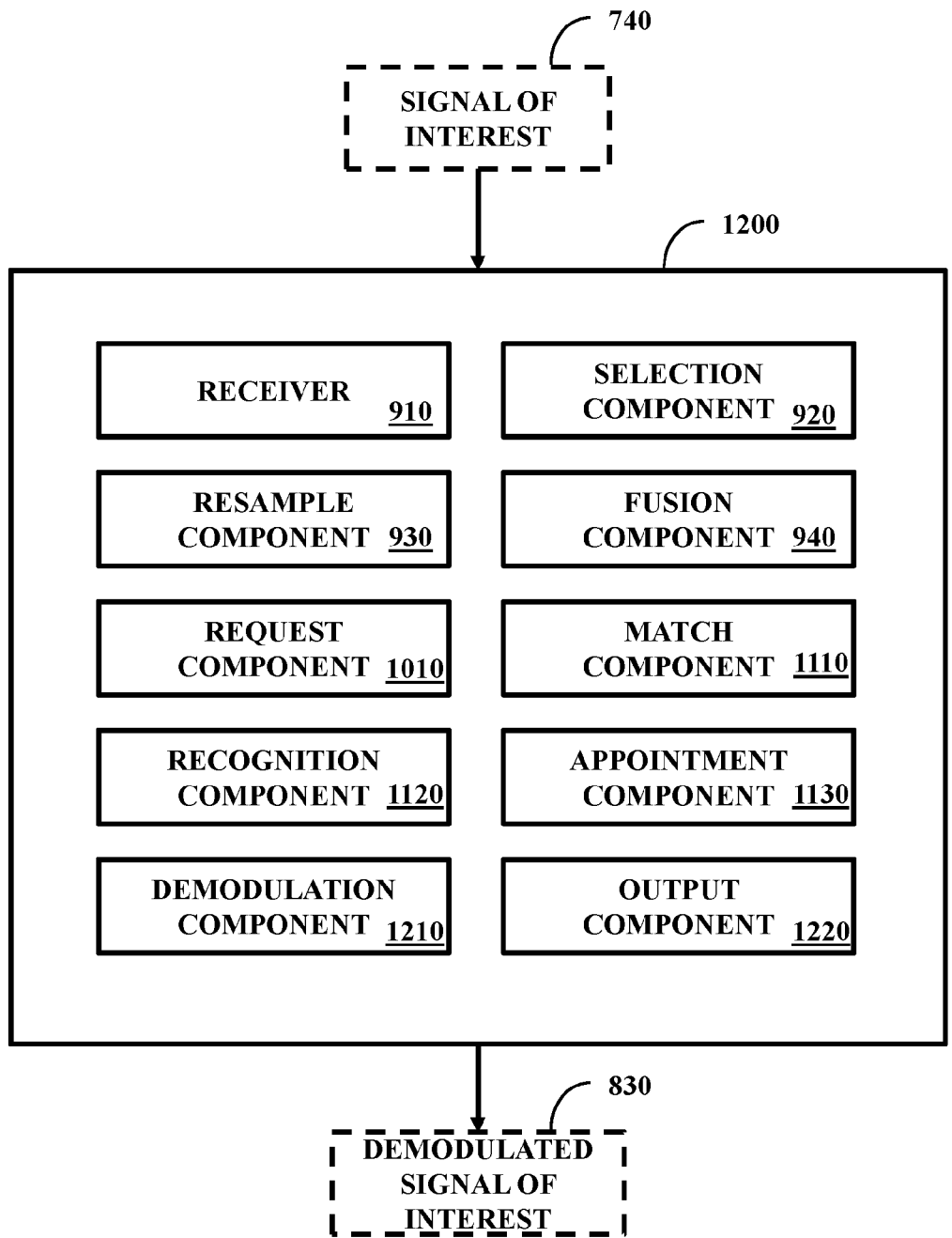
FIG. 12 illustrates one embodiment of a system comprising the receiver, the selection component, the resample component, the fusion component, the request component, the match component, the recognition component, the appointment component, a demodulation component, and an output component.

FIG. 12 illustrates one embodiment of a system 1200 comprising the receiver 910, the selection component 920, the resample component 930, the fusion component 940, the request component 1010, the match component 1110, the recognition component 1120, the appointment component 1130, a demodulation component 1210, and an output component 1220. The demodulation component 1210 can demodulate the signal of interest 740 through use of the modulation scheme for the signal of interest 740. The output component 1130 can cause the signal of interest (e.g., as the demodulated signal of interest 830) to be outputted after demodulation.

In one embodiment, the signal of interest 740 is unknown to the system 1200. In one example, the modulation scheme of the signal of interest 740 may not be known to the system 1200. In this scenario a best matching demodulation scheme can be appointed for the signal of interest 740.

In one embodiment, the first sensor 530 of FIG. 5 is a dumb sensor that is part of a first network while the second sensor 540 of FIG. 5 is a dumb sensor that is part of a second network. The first network and second network can be different networks or the first sensor 530 of FIG. 5 and the second sensor 540 of FIG. 5 can be on a single network. In one embodiment, the first sensor 530 of FIG. 5 (e.g., that is part of a first personal electronic device with a primary purpose other than functioning as a sensor of the first signal copy 550 of FIG. 5) does not make a local decision regarding synchronization of the first signal copy 550 of FIG. 5 while the second sensor 540 of FIG. 5 (e.g., that is part of a second personal electronic device with a primary purpose other than functioning as a sensor of the second signal copy 560 of FIG. 6) does not make a local decision regarding synchronization of the second signal copy 560 of FIG. 5. It is to be appreciated by one of ordinary skill in the art that references to an item with a reference number in one figure (e.g., FIG. 5) can be applicable to the same item with the same reference number in another figure (e.g., FIG. 9).

Figure 13:
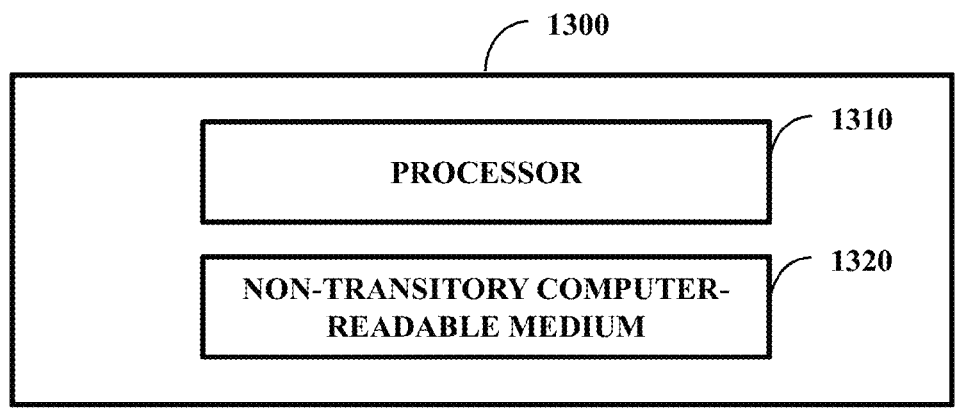
FIG. 13 illustrates one embodiment of a system comprising a processor and a non-transitory computer-readable medium.

FIG. 13 illustrates one embodiment of a system 1300 comprising a processor 1310 and a non-transitory computer-readable medium 1320. In one embodiment, the non-transitory computer-readable medium 1320 is configured to store computer-executable instructions that when executed by the processor 1310, cause the processor 1310 to perform a method disclosed herein (e.g., the method 1400 discussed in the next paragraph). In one embodiment, the non-transitory computer-readable medium 1320 is communicatively coupled to the processor 1310 and stores a processor executable command set to facilitate operation of at least one component disclosed herein. In one embodiment, a network of the signal of interest discussed herein is unknown to the processor 1310 and/or the non-transitory computer-readable medium 1320 (e.g., a modulation scheme of the signal of interest 740 of FIG. 7 is unknown).

Figure 14:
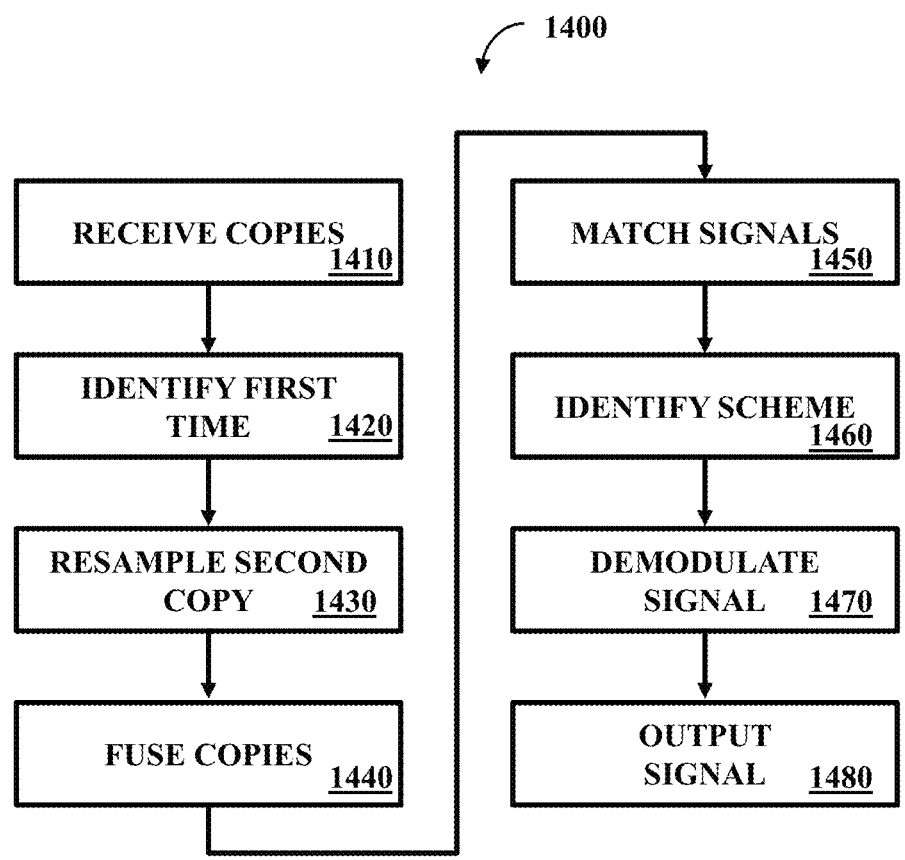
FIG. 14 illustrates one embodiment of a method comprising actions.

FIG. 14 illustrates one embodiment of a method comprising actions 1410-1480. At 1410, there is receiving a first signal copy of a signal of interest from a first sensor, where the first signal copy is a digital signal sampled at a first sampling time period. In addition, at 1410, there is receiving a second signal copy of a signal of interest from a second sensor, where the second signal copy is a digital signal sampled at a second sampling time period, where the first sampling time period is different from the second sampling time period, where the first sensor and second sensor are different sensors, and where the first sensor and second sensor are asynchronous. At 1420, there is identifying the first sampling time period while at 1430, there is resampling the second signal copy in accordance with the first sampling time period to produce a resampled second signal copy, where the resampled second signal copy and the first signal copy have the same sampling time period. At 1440, fusing the first signal copy and the second signal copy into a fused signal copy occurs. At 1450, matching the signal of interest with a known signal takes place. Identifying a modulation scheme associated with the known signal occurs at 1460. At 1470, there is demodulating the signal of interest through use of the modulation scheme. At 1480, outputting the signal of interest after demodulation occurs.

In one embodiment, the signal of interest is unknown to the system (e.g., a modulation scheme of the signal of interest is unknown) and a frequency of the signal of interest is unknown. The first sensor is non-cooperative with the second sensor and the second sensor is non-cooperative with the first sensor. The first network and second network are different networks and the first sensor and the second sensors are dumb sensors. The first sensor does not make a local decision regarding synchronization of the first signal copy and the second sensor does not make a local decision regarding synchronization of the second signal copy.

In one embodiment, the first sensor is part of a first personal electronic device with a primary purpose other than functioning as a sensor of the first signal copy. The second sensor is part of a second personal electronic device with a primary purpose other than functioning as a sensor of the second signal copy.

What is claimed is:

1. A method, comprising:
    identifying a first signal copy as a reference signal, where the first signal copy is a copy of a signal of interest and where the first signal copy is a digital signal sampled at a first sampling time period;
    resampling a second signal copy of the signal of interest in accordance with the first sampling time period to produce a resampled second signal copy, where the second signal copy is a digital signal sampled at a second sampling time period and where the first sampling time period and the second sampling time period are different;
    fusing the first signal copy with the resampled second signal copy into a fused copy of the signal of interest;
    matching the fused copy of the signal of interest with a known signal;
    recognizing a modulation scheme associated with the known signal; and
    appointing the modulation scheme associated with the known signal as a modulation scheme for the signal of interest;
    demodulating the fused copy of the signal of interest through use of the modulation scheme for the signal of interest; and
    causing the signal of interest to be outputted after demodulation.

2. The method of claim 1, where the first signal copy is a copy of the signal of interest from a first sensor, where the second signal copy is a copy of the signal of interest from a second sensor, where the first sensor and the second sensor are different sensors, where the first sensor is part of a first network, where the second sensor is part of a second network, and where the first network and second network are different networks.

3. The method of claim 2, where the first sensor and the second sensor are asynchronous with one another.

4. The method of claim 1, the method comprising:
    sending a signal copy request to a first sensor;
    sending the signal copy request to a second sensor;
    receiving the first signal copy from the first sensor in response to the signal copy request, where the first signal copy is identified as the first reference signal after reception; and receiving the second signal copy from the second sensor in response to the signal copy request, where the second signal copy is resampled after reception.

5. The method of claim 4, where the first sensor and the second sensor are asynchronous with one another.

6. The method of claim 4, where the first sensor is part of a first network, where the second sensor is part of a second network, and where the first network and second network are different networks.

7. The method of claim 4, where the first signal copy when received is a first time-stamped data packet and where the second signal copy when received is a second time-stamped data packet.

8. The method of claim 1, where matching the signal of interest with a known signal comprises matching the fused copy of the signal of interest with the known signal.

9. The method of claim 1, where matching the signal of interest with a known signal occurs before the first signal copy is fused with the resampled second signal copy into the fused copy of the signal of interest.

10. The method of claim 1, where the first signal copy is a copy of the signal of interest from a first sensor, where the second signal copy is a copy of the signal of interest from a second sensor, where the first sensor and the second sensor are different sensors, where the first sensor is part of a first electronic device with a primary purpose other than functioning as a sensor of the first signal copy, and where the second sensor is part of a second electronic device with a primary purpose other than functioning as a sensor of the second signal copy.

11. The method of claim 1, where the method is at least in part performed by a processor and where a network of the signal of interest in unknown to the processor.

12. A non-transitory computer-readable medium configured to store computer-executable instructions that when executed by a processor cause the processor to perform a method, the method comprising:
receiving a first signal copy of a signal of interest from a first sensor, where the first signal copy is a digital signal sampled at a first sampling time period;
receiving a second signal copy of the signal of interest from a second sensor, where the second signal copy is a digital signal sampled at a second sampling time period, where the first sampling time period is different from the second sampling time period, where the first sensor and second sensor are different sensors, and where the first sensor and second sensor are asynchronous;
identifying the first sampling time period;
estimating and resampling the second signal copy in accordance with the first sampling time period to produce a resampled second signal copy, where the resampled second signal copy and the first signal copy have the same sampling time period;
fusing the first signal copy and the resampled second signal copy into a fused signal copy of the signal of interest;
matching the fused copy of the signal of interest with a known signal;
identifying a modulation scheme associated with the known signal;
demodulating the fused copy of the signal of interest through use of the modulation scheme; and
outputting the signal of interest after demodulation.

13. The non-transitory computer-readable medium of claim 12, where the signal of interest is unknown to the non-transitory computer-readable medium, where a frequency of the signal of interest is unknown, where the first sensor is non-cooperative with the second sensor, where the second sensor is non-cooperative with the first sensor, where the first sensor and the second sensor are dumb sensors, where the first sensor does not make a local decision regarding synchronization of the first signal copy, and where the second sensor does not make a local decision regarding synchronization of the second signal copy.

14. The non-transitory computer-readable medium of claim 12, where the first sensor is part of a first electronic device with a primary purpose other than functioning as a sensor of the first signal copy and where the second sensor is part of a second electronic device with a primary purpose other than functioning as a sensor of the second signal copy.

15. A system, comprising:
an identification component configured to identify a first signal copy as a reference signal, where the first signal copy is a copy of a signal of interest, where the first signal copy is a digital signal sampled at a first sampling time period, and where a network of the signal of interest is unknown to the system;
a resample component configured to resample a second signal copy of the signal of interest in accordance with the first sampling time period to produce a resampled second signal copy, where the second signal copy is a digital signal sampled at a second sampling time period and where the first sampling time period and the second sampling time period are different;
a fusion component configured to fuse the first signal copy with the resampled second signal copy into a fused copy of the signal of interest; and
a demodulation component configured to perform a demodulation on the fused copy of the signal of interest.

16. The system of claim 15, comprising:
a match component configured to match the signal of interest with a known signal; and
a recognition component configured to recognize a modulation scheme associated with the known signal, where the demodulation component is configured to perform the demodulation through use of the demodulation scheme associated with the known signal.

17. The system of claim 15, comprising:
a receiver configured to receive the first signal copy and configured to receive the second signal copy, where the first signal copy is identified as the reference signal after reception and where the second signal copy is resampled after reception.

18. The system of claim 17, where the receiver is configured to receive the first signal copy from a first sensor, where the receiver is configured to receive the second signal copy from a second sensor, where the fusion component sends a request to the first sensor, where the first sensor sends the first signal copy that is received by the receiver in response to the request to the first sensor, where the fusion component sends a request to the second sensor, where the second sensor sends the second signal copy that is received by the receiver in response to the request to the second sensor.

19. The system of claim 15, where the first signal copy is a copy of the signal of interest from a first sensor, where the second signal copy is a copy of the signal of interest from a second sensor, where the first sensor and the second sensor are different sensors, where the first sensor is part of a first electronic device with a primary purpose other than functioning as a sensor of the first signal copy, and where the second sensor is part of a second electronic device with a primary purpose other than functioning as a sensor of the second signal copy.

20. The system of claim 15, comprising:
an output component, that is implemented, at least in part, by way of hardware, configured to output the fused copy of the signal of interest after demodulation.

* * * * *